United States Patent

[11] 3,588,258

| [72] | Inventor | Alfred R. Sendt |
| | | Gutersloh, Germany |
| [21] | Appl. No. | 882,551 |
| [22] | Filed | Dec. 5, 1969 |
| [45] | Patented | June 28, 1971 |
| [73] | Assignee | Owen-Illinois Inc. |
| | | Toledo, Ohio |
| | | Division of Ser. No. 633,764, Apr. 26, 1967, |
| | | Pat. No. 3,505,526 |

[54] APPARATUS FOR THE DETECTION OF CHECKS IN GLASS CONTAINERS
1 Claim, 5 Drawing Figs.

| [52] | U.S. Cl...................................................... | 356/240, |
| | | 250/223B |
| [51] | Int. Cl....................................................... | G01n 21/24, |
| | | G02b 5/11, G01n 21/22 |
| [50] | Field of Search........................................ | 356/339, |
| | 340, 198, 237; 250/227, 223 (B) | |

[56] References Cited
UNITED STATES PATENTS

| 3,245,533 | 4/1966 | Rottmann..................... | 209/111.7 |
| 3,349,906 | 10/1967 | Calhoun et al................ | 209/111.7 |
| 3,386,579 | 6/1968 | Schulze et al................. | 209/111.7 |
| 3,479,514 | 11/1969 | Kidwell........................ | 250/223 |

*Primary Examiner*—Robert Segal
*Attorneys*—D. T. Innis and E. J. Holler

ABSTRACT: Apparatus for the detection of cracks in objects made of a transparent material, more especially for the inspection of glass containers for their freedom from finish checks. The apparatus is equipped with an illuminating device utilizing a plurality of fiber-optic bundles which illuminate that part of the article which is undergoing inspection from several directions while the article is preferably rotated on its central axis. A receiver, positioned on the opposite side of the wall of the container, will be struck by the reflected light if a crack is present. The receiver may be connected to an ejector which throws out the defective glass container, thus enabling a complete automatic inspection of the glass containers for their freedom from cracks.

INVENTOR.
ALFRED SENDT

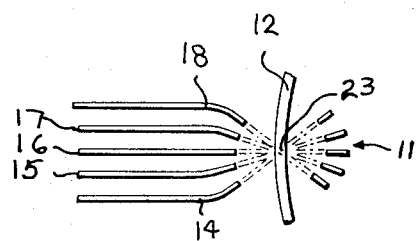
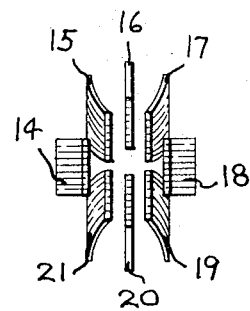
FIG. 2  FIG. 3
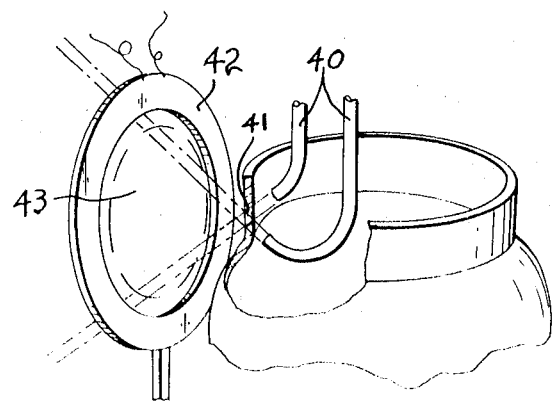
FIG. 5

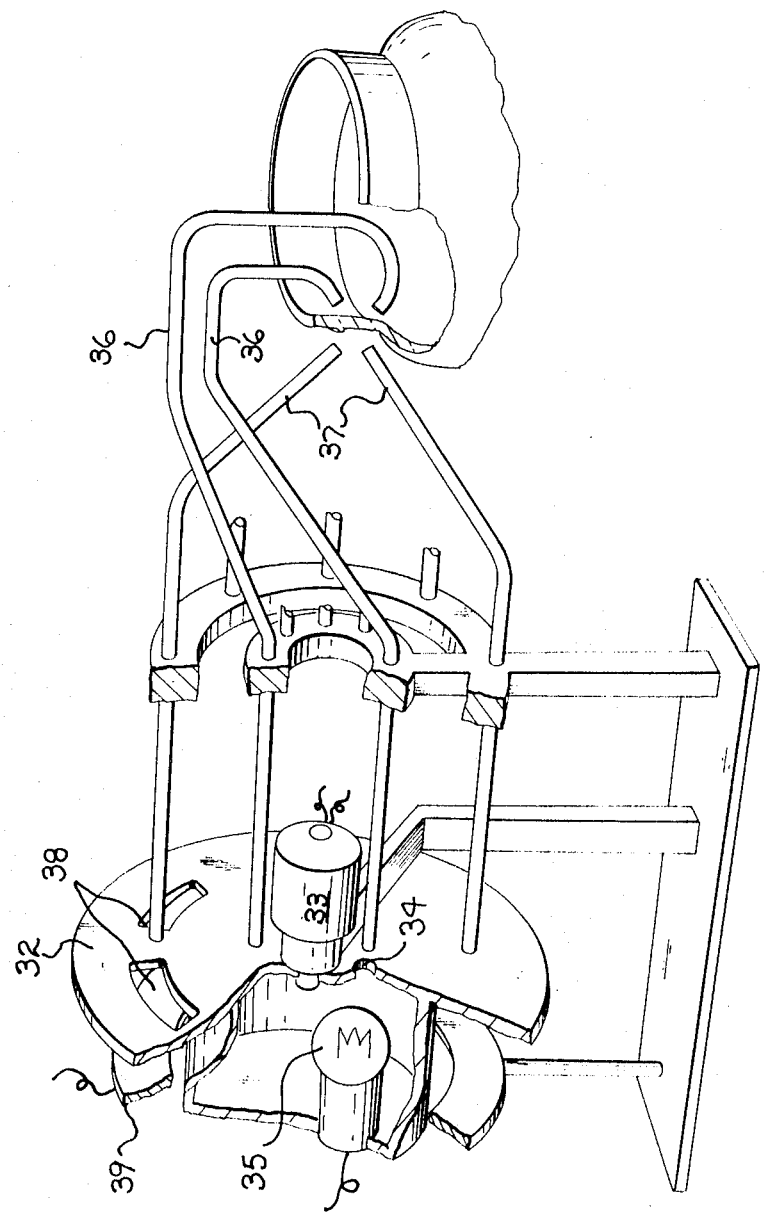

APPARATUS FOR THE DETECTION OF CHECKS IN GLASS CONTAINERS

RELATED APPLICATION

This application is a Divisional of my application Ser. No. 633,764 filed Apr. 26, 1967 now Pat. No. 3,505,526.

BACKGROUND OF THE INVENTION

Presently existing optical inspection apparatus used for the purpose of inspecting containers for checks or other visual defects of the type which will reflect light, commonly require optical systems consisting of numerous lenses and mirrors. These devices are usually of fairly large size in relation to the size of the containers being inspected, particularly containers having narrow-neck finishes. Normally, it is desirable that the defect illuminating means be inserted within the finish of a container. Thus, conventional optical systems of large size are not readily adaptable to inspection of narrow-neck finishes.

Finish checks are frequently located in many different positions in relation to the axis of the container and for this reason it is generally not sufficient to illuminate the finish from one direction only. The glass article to be inspected must, as a rule, be illuminated from various angles which presents additional problems with respect to the arrangement and placing of presently existing illuminating devices. Furthermore, additional problems may arise due to the fact that part of the intensity of each additional beam of light, concentrated on the container finish, may be conducted further inside the glass and can emerge at many different uncontrollable places. In this situation, not only the light reflected by the cracks is transmitted to the receiver, but also a certain amount of stray light will possibly reach the receiver, thus lowering the sensitivity of the inspection device. Furthermore, the orientation of the photosensitive receiver must be very carefully considered in relation to the arrangement for illuminating the portion of the container to be inspected.

SUMMARY OF THE INVENTION

This invention relates to apparatus for the detection of cracks or checks in objects made of transparent material which may be made in a simple and compact construction. By reason of its compact construction, the apparatus of the invention is capable of inspecting for checks or other defects in narrow-neck containers in the finish or in other spots not easily accessible to inspection.

By providing an illuminating device and/or a receiver formed of a plurality of optical fiber bundles which are arranged to conduct the light to or from the part of the object to be inspected, better direction of illumination and better selectivity of viewing is accomplished.

Further features of the invention will be apparent from the following description taken in conjunction with the annexed sheets of drawings.

BRIEF DESCRIPTION OF THE DRAWINGS

FIG. 2 is a top plan view of the apparatus of FIG. 1;

FIG. 3 is an elevational view of the illuminating fiber optics of FIG. 1;

FIG. 4 is a perspective view of a second embodiment of the invention; and

FIG. 5 is a perspective view of a third embodiment of the invention.

Figure 1:
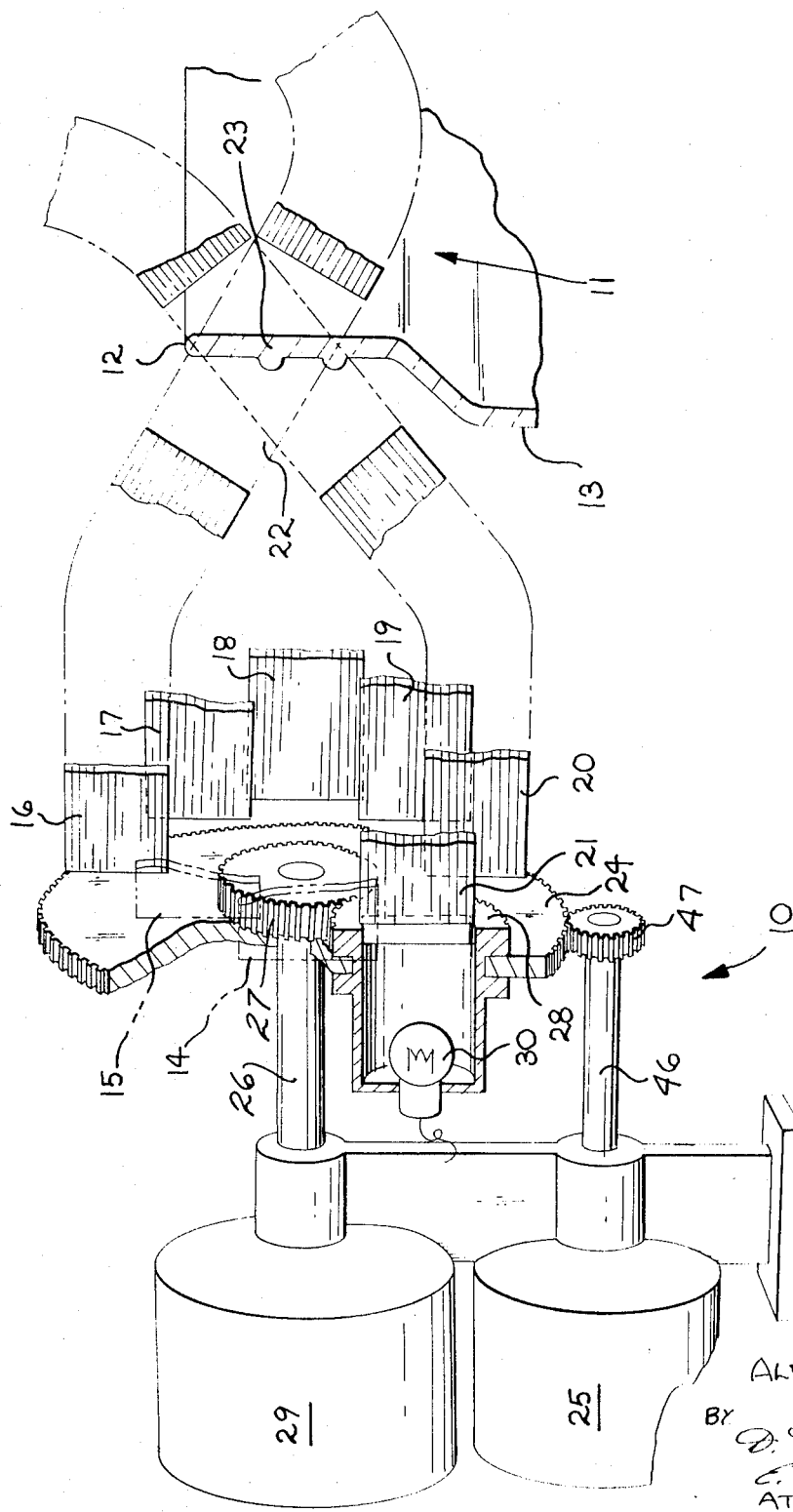
FIG. 1 is a perspective view, with parts broken away, illustrating one embodiment of the invention.

It should be kept in mind that throughout this description the term "fiber optical bundles" is used and this term means that the individual fibers are formed from a light conductive material having a relatively high refractory index forming the core, with this core surrounded by a tube whose refractive index is relatively low in view of the light to be transmitted. Fiber optical devices have total internal reflection and are characteristically flexible when formed into bundles.

Advantageously, the ends of the optical fiber bundles facing that portion of the article which is to be inspected are arranged in the form of a cone-shaped shell, with their virtual apex located in the portion of the object to be inspected. This ensures that the light rays leaving the ends of the optical fiber bundles will strike the portion of the article being inspected from many directions so that any check, no matter where it is located, will provide a reflection which will reach the light sensitive receiver.

In the case of a glass container whose finish is being inspected, it is necessary that the container be rotated about its vertical axis so that the entire circumference of the container finish will pass the inspection apparatus.

With particular reference to FIGS. 1—3, one form of the inspection apparatus consists basically of an illuminating device, generally designated 10, and a receiver, generally designated 11, by means of which the finish 12 of the glass container 13, rotating on its longitudinal axis, is inspected for checks.

The illuminating device 10 is formed of several optical fiber bundles 14, 15, 16, 17, 18, 19, 20 and 21 which conduct the light emitted by the light source 22 to the part 12 of the article to be inspected.

Each of the bundles consists of a number of totally reflecting light conductive fibers. The ends of the fiber bundles facing the object to be inspected are advantageously arranged in the form of a cone-shaped shell so that their virtual apex 23 essentially coincides with the portion of the article to be inspected. The ends of the fiber bundles facing the finish 12 preferably have a rectangular or elongated cross section, as shown particularly in FIG. 3, so that the entire finish of the glass container will be illuminated throughout its height.

The glass container is rotated about is longitudinal axis so that the entire circumference of the finish will be illuminated by the light rays leaving the fiber bundles. It is preferable that each of the bundles 14—21 be illuminated in succession so as to increase the sensitivity or signal-to-noise ratio of the inspection device.

The arrangement for providing successive illumination of the individual fiber bundles in succession is provided by a disc 24 which is driven by a motor 25 through shaft 46 and gear 47.

Extending through the center of the disc 24 is a shaft 26 to which is connected a spur gear 27. The disc 24 carries a smaller slotted disc 28 having gear teeth about its circumference which are in mesh with the spur gear 27. Thus the slotted disc 28 will be rotated about the axis of the large disc 24 and in turn be rotated about its own axis by the engagement with the driven spur gear 27. The shaft 26, as shown, is connected to a motor 29. In this manner the slotted disc will move in succession to be in alignment with the ends of the fiber optic bundles.

A source of light 30 is mounted to the back of the disc 24 in alignment with the slotted disc 28 so as to provide illumination through the slotted disc 28 at all times.

As can be seen by this arrangement, each bundle of fibers will be illuminated successively and will provide a narrow, vertical band of light impinging on the finish of the container from various directions.

When a defect such as a crack is present in the finish of the container, light will be reflected therefrom. This reflected light will be conducted by way of a second set of optical fiber bundles located in the receiver head 31 to the actual light sensitive pickup.

As is well known, most checks are radially oriented with respect to the axis of the container. In the event light were to be conducted through all of the illuminating bundles simultaneously, the light reflected by a check will, if the arrangement of the bundles in the receiver is correct, generally coincide with the path taken by the rays coming from the primary bundle of fibers. Sensitivity, with respect to the ability of a receiver to distinguish between a large background intensity light falling upon the receiver compared to light reflected from a defect, would be poor. The receiver would be unable to distinguish whether the light had been transmitted straight through the container to the receiver or whether it had been reflected from a check before entering the receiver. Thus it is desirable that the receiver head be provided with optical gating, similar to that described above with respect to gating of the light into the fiber optic illuminating device.

The relationship of the gating should be such that when a particular fiber optic bundle on the illuminating side is provided with light, the optical bundle on the receiver side, which is in alignment with the illuminated bundle, be masked off since the primary light will be falling on this particular receiver bundle.

As another example of such an arrangement, reference may be had to the second embodiment of the apparatus of the invention, illustrated in FIG. 4.

This particular embodiment utilizes a perforated disc 32 which is rotated about its axis by a motor 33. As can be seen, the disc 32 has a single opening 34 adjacent its axis of rotation. A source of light 35 positioned in back of the disc will shine through the opening 34, thus providing illumination for the ends of a plurality of the illuminating fibers 36 which lead to the interior of the container being inspected (only two of which are shown in full).

A series of receiver fibers 37 (only two of which are shown in full) are positioned adjacent the finish of the container in alignment with the ends of the fibers 36 and have their opposite ends in close proximity to the front face of the disc 32 adjacent its periphery. A pair of slots 38 are formed in the disc in alignment with these ends of the receiver fibers 37.

A photosensitive device 39 is positioned behind the disc 32 so that light received by the fibers 37 will pass through the disc 32 when the disc is oriented such that the slots 38 are exposed to the ends of the illuminated fibers. In this manner both the illuminating light and the receiving light is chopped in the proper sequence so that illumination from a lighted fiber is not received by the opposed, directly aligned receiver fiber.

While FIG. 4 shows only two complete sets of fibers on the receiving as well as illuminating side, it should be kept in mind that it is contemplated that, for example, 8 equispaced illuminating fibers and 8 equispaced receiving fiber bundles be used so as to again provide multidirectional illumination of the finish to be inspected.

In those situations where the sensitivity of the device is not so critical, an arrangement such as shown in FIG. 5 may be employed. In the embodiment shown in FIG. 5, a plurality of illuminating fibers 40, of which only two of 8 are shown, are all directed at the finish from different angles yet describing a cone whose apex 41 is coincident with the finish. The cone of light formed by the fibers 40 will pass through the container undisturbed if no defect causes reflection thereof. A receiver in the form of an annular light sensitive cell 42, such as a solar cell, is positioned on the opposite side of the container. The opening 43 in the cell 42 is larger than the normal cone of light passing out of the container finish. When a crack or check appears in the container and, during the rotation thereof, passes into the field of the incident light, the light will be deflected out of its straight path and strike the light sensitive ring 42. When light strikes the ring a voltage is produced which may be used to operate a reject or sorting mechanism. In this particular embodiment, it is not necessary to gate the light to the fibers 40, and all of the fibers may be illuminated simultaneously.

While the inspection device of the invention has been described in its three embodiments as being used for inspecting glass containers, it should be apparent that the principles of the invention have equal applicability to the inspection of flat glass or transparent plastic articles. Furthermore, the invention is suitable for inspecting glass containers in areas other than the finish, for example, shoulders and heels when checks are also likely to occur.

I claim:

1. Apparatus for inspecting glass containers for defects comprising, a first plurality of elongated fiber optic devices with the one ends thereof arranged in a circle and the opposite ends arranged to form a cone of light incident on a container to be inspected, a circular disc having its axis coincident with the circle formed by said first fiber optic devices and positioned in close proximity to the one ends of the first fiber optic devices, means for rotating said disc about its axis, said disc having a first aperture therein in alignment with the circle described by the ends of said first fiber optic devices, means for illuminating said aperture, a second plurality of fiber optic devices, said second fiber optic devices having their one ends in conical array facing the container on the side opposite the first fiber optic devices, the other ends of said second fiber optic devices describing a circle and being closely spaced from the front face of the disc on a different diameter than the circle described by the first fiber optic devices, said disc having at least one second aperture thereon in alignment with the ends of the second fiber optic devices and an annular light sensitive pickup positioned in back of said disc in axial alignment with the ends of the second fiber optic devices whereby the incident light is gated by said first aperture and the light passing through the container is gated by the second aperture in said disc.